(12) United States Patent
Köhler et al.

(10) Patent No.: US 9,709,159 B2
(45) Date of Patent: Jul. 18, 2017

(54) METHOD FOR CONTROLLING THE TRANSFER OF TORQUE OF A FORCE-FITTING SHIFT ELEMENT

(71) Applicant: ZF Friedrichshafen AG, Friedrichshafen (DE)

(72) Inventors: Christoph Köhler, Friedrichshafen (DE); Frank Deprez, Mariabrunn (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 15/179,984

(22) Filed: Jun. 11, 2016

(65) Prior Publication Data
US 2016/0363215 A1    Dec. 15, 2016

(30) Foreign Application Priority Data

Jun. 11, 2015    (DE) .................. 10 2015 210 670

(51) Int. Cl.
*F16H 61/02*    (2006.01)
*F16H 61/00*    (2006.01)
(Continued)

(52) U.S. Cl.
CPC ......... *F16H 61/0021* (2013.01); *B60K 6/387* (2013.01); *B60K 6/40* (2013.01); *B60K 6/46* (2013.01); *F16D 48/066* (2013.01); *F16H 61/0265* (2013.01); *F16H 61/0276* (2013.01); *B60Y 2200/92* (2013.01); *B60Y 2300/42* (2013.01); *B60Y 2300/426* (2013.01); *F16D 2500/1045* (2013.01); *F16D 2500/1107* (2013.01); *F16D 2500/50287* (2013.01); *F16H 61/0031* (2013.01); *F16H 61/061* (2013.01); *F16H 63/46* (2013.01); *Y10S 903/914* (2013.01);
(Continued)

(58) Field of Classification Search
CPC ............. F16H 61/0021; F16H 61/0265; F16H 61/0276; F16H 61/02; F16D 48/066
See application file for complete search history.

(56) References Cited

U.S. PATENT DOCUMENTS 5,609,068 A    3/1997    Gruhle et al.
5,865,707 A    2/1999    Shimada et al.
(Continued)

FOREIGN PATENT DOCUMENTS

DE    4240621 A1    6/1994
DE    10031180 A1    4/2001
(Continued)

OTHER PUBLICATIONS

German Search Report DE102015210670.5, dated Feb. 22, 2016. (8 pages).

*Primary Examiner* — Huan Le
(74) *Attorney, Agent, or Firm* — Dority & Manning, P.A.

(57) ABSTRACT

A method for controlling torque transfer of a force-fitting shift element includes controlling a closing pressure at least temporarily upon presence of a closing request for the force-fitting shift element and when a prevailing system pressure of the hydraulic circuit is above a threshold value for the system pressure. The closing pressure is controlled in a manner that is different than upon the presence of the closing request for the force-fitting shift element and when the prevailing system pressure is below the threshold value for the system pressure.

13 Claims, 4 Drawing Sheets

(51) Int. Cl.
*B60K 6/387* (2007.10)
*B60K 6/40* (2007.10)
*B60K 6/46* (2007.10)
*F16D 48/06* (2006.01)
*F16H 63/46* (2006.01)
*F16H 61/06* (2006.01)

(52) U.S. Cl.
CPC ........ *Y10S 903/946* (2013.01); *Y10S 903/951* (2013.01)

(56) References Cited

U.S. PATENT DOCUMENTS

| | | | |
|---|---|---|---|
| 6,540,635 | B1 | 4/2003 | Sano |
| 7,073,328 | B2 | 7/2006 | Knoblauch |
| 7,794,349 | B2 | 9/2010 | Gierer et al. |
| 2012/0137670 | A1* | 6/2012 | Shimizu .............. F16H 61/0021 60/430 |
| 2014/0305243 | A1 | 10/2014 | Schmidt et al. |

FOREIGN PATENT DOCUMENTS

| | | |
|---|---|---|
| DE | 10159519 A1 | 7/2003 |
| DE | 102005012590 A1 | 9/2006 |
| DE | 102012208079 A1 | 11/2013 |
| DE | 102013206254 A1 | 10/2014 |
| EP | 0783079 A1 | 7/1997 |

\* cited by examiner

METHOD FOR CONTROLLING THE TRANSFER OF TORQUE OF A FORCE-FITTING SHIFT ELEMENT

FIELD OF THE INVENTION

The invention relates generally to a method for controlling the transfer of torque of a friction-type or force-fitting shift element. The invention further relates generally to a control device for operating a drive train with such a shift element.

BACKGROUND

Force-fitting shift elements are frequently used in the drive trains of motor vehicles, for example in automatic transmissions. Force-fitting shift elements, such as multi-disk clutches or multi-disk brakes, are characterized by a variable torque transfer capability. An overlapping, simultaneous opening of a first force-fitting shift element and closing a second force-fitting shift element enables, for example, a power shifting of an automatic transmission. Such shift elements are frequently closed by a hydraulic closing pressure acting on a piston against a spring force or against a counter-force acting on a different side of the piston. The closing pressure acting on the piston is predetermined by a control valve. For this purpose, a control unit sends a control signal to the control valve, which, depending on the control signal, by setting the valve lift, transmits the system pressure of a hydraulic circuit to the piston, or reduces such pressure. If the control valve is fully open, apart from any possible flow losses and leakage losses, the full system pressure applies at the piston, which leads to the closing of the shift element. If the control valve is fully closed, apart from leakage at the valve, no closing pressure applies at the piston. If the shift element is preloaded by a spring in its open position, the spring force thereby leads to the opening of the shift element.

Patent application DE 42 40 621 A1 of the applicant discloses a method for controlling and regulating load transfer for an automatic transmission. Thereby, an overlapping shift is described, whereas, after the shift is concluded, the engaging clutch is driven to the maximum pressure.

Patent application EP 0 783 079 A1 describes a method for the shift control of an automatic transmission. Therein, at the end of the shift, the valve allocated to the shift element to be closed is open, by which the maximum pressure is applied at the closing piston, in order to fully close the shift element.

The driving of the engaging shift element to the maximum pressure serves the purpose of, among other things, flushing the hydraulic valve that is allocated to the shift element. Thereby, the depositing of contaminants present in the hydraulic oil at, for example, the control edges of the hydraulic valve, can be avoided.

However, through the full opening of the hydraulic valve, the system pressure prevailing in the hydraulic circuit is applied at the piston, reduced by any possible flow or leakage losses. However, in certain individual cases, this high closing pressure for the shift element is not necessary at all to securely transfer the torque to be transferred by the shift element. As such, the shift element must be accordingly designed for this closing pressure, although the closing pressure required to perform the function would be lower. Due to the higher mechanical stress, both the component weight and the need for installation space of the shift element increase. However, under certain circumstances, other users of the hydraulic circuit require a high system pressure, such that a reduction in system pressure is not possible.

SUMMARY OF THE INVENTION

As such, the present subject matter provides a method for controlling the transfer of torque of a force-fitting shift element, through which the depositing of the contaminants present in the hydraulic oil on the control valve of the shift element can be avoided, and at the same time the component load of the shift element can be reduced.

Accordingly, a method for controlling the transfer of torque of a force-fitting shift element is proposed, which can be closed by a closing pressure acting on a piston. The force-fitting shift element is formed, for example, as a wet multi-disk clutch. A control valve is configured, through the setting of the valve lift, depending on a control signal of a control unit, to transmit the system pressure of a hydraulic circuit to the piston, or to reduce it as needed. The control unit is preferably an electronic control unit. The control valve can be designed as an electromagnetically actuated valve (e.g., a solenoid), whereas the control unit applies power to the electromagnets of the control valve, and thus directly controls the control valve. The control valve may also be formed as a hydraulically pilot-controlled valve. For this purpose, an additional valve, which is formed as an electromagnetic valve, may be provided. The control unit controls the current supply to this additional valve, which emits a hydraulic control signal at its output, and thus controls the hydraulic pilot-controlled control valve. In both cases, the valve lift of the control valve is controlled depending on a control signal of the control unit.

If there is a request for closing the shift element, the closing pressure for closing the shift element is controlled, in accordance with exemplary aspects of the invention, depending on the prevailing system pressure of the hydraulic circuit. If the prevailing system pressure, provided (for example) by an oil pump and a downstream system pressure valve, is above a threshold value, the closing pressure is at least temporarily controlled in a manner different than when the prevailing system pressure is below such threshold value. Through this dependence on the closing pressure on the currently prevailing system pressure, it is possible to, at a system pressure below a critical pressure, achieve a good flushing of the valve, and, at a system pressure above the critical pressure, keep the mechanical load of the shift element under control. Thereby, deposits at the control valve can be reduced, without the mechanical structure of the shift element being designed to be unnecessarily pressure-resistant.

Preferably, at a system pressure above the threshold value for the system pressure, the closing pressure is controlled depending on a torque to be transferred by the shift element. For this purpose, a torque model (for example), which provides a defined closing pressure depending on a target transfer torque, can be stored in the control unit. Since, in any case, the shift element must be designed such that it can handle the torque to be transferred, the shift element is thus always acted upon by the minimum required pressure load. Preferably, the closing pressure contains an offset, in order to securely transfer the torque to be transferred without taking the shift element into a slip state.

According to an exemplary embodiment of the invention, with a system pressure below the threshold value for the system pressure, the control valve is fully open. Thereby, the system pressure acts without any reduction (except for flow losses and leakage losses) on the piston, which closes the shift element. As such, the closing pressure essentially corresponds to the system pressure. Thereby, the threshold value for the system pressure is selected in such a manner that, at this pressure load, the shift element is not damaged. Through the full opening of the control valve, the maximum volume flow is available for cleaning the control valve. Preferably, the control valve is thereby fully open only at predetermined time intervals. As a result, an unnecessarily high leakage rate can be avoided. Alternatively, the varying control may also take place continuously, as long as there is a request for closing the shift element.

According to another embodiment of the invention, at a system pressure below the threshold value for the system pressure, the valve lift of the control valve is set at an intermediate position, at which a maximum permissible closing pressure may arise. In this intermediate position, the control valve is not fully open, but at least open to the extent that sufficient volume flow is available to wash away deposits. The intermediate position is selected in such a manner that an unreduced transmission of the system pressure to the piston is not possible. Thereby, a safety reserve is added, in order not to excessively burden the shift element upon suddenly occurring pressure peaks in the system pressure. Preferably, the control valve is thereby set at this intermediate position only in predetermined time intervals, in order to avoid an unnecessarily high leakage rate. Alternatively, the varying control may also take place continuously, as long as there is a request for closing the shift element.

Preferably, a pressure sensor is used to determine the currently prevailing system pressure. As a result, the current pressure value is available with a high degree of security. This is primarily advantageous for the arrangement in which the control valve is fully open at a system pressure below the threshold value for the system pressure, in order to, upon pressure peaks, be able to quickly change to the torque-dependent closing pressure control.

If the prevailing system pressure is controlled by a system pressure valve, the setpoint control of the system pressure valve can be used to determine the prevailing system pressure. The system pressure valve is downstream of the pressure supply of the hydraulic circuit, and is configured to, depending on a controllable setpoint, reduce a high input pressure to a lower target system pressure. Pressure peaks in the system pressure that actually occur, for example caused by a consumer of the hydraulic system, cannot be detected using the setpoint. Therefore, this detection of the prevailing system pressure is suitable mainly for those arrangements with which the control valve is set below the threshold value for the system pressure only at the intermediate position.

The prevailing system pressure can also be determined by a pressure model. This is advantageous, for example, if a second oil pump downstream of the system pressure valve feeds oil pressure into the hydraulic circuit, such that a setpoint of the system pressure valve cannot reproduce the prevailing system pressure in all operating conditions. The pressure model thereby establishes a relationship between the power consumption of the oil pump and the pressure generated. Such a second oil pump may be, for example, electrically powered, and is common, for example, with hybrid vehicles, in order to, even upon the stopping of a main oil pump otherwise driven by the transmission input shaft, ensure an oil supply of the transmission.

It is also possible to combine at least some of the different options for determining the prevailing system pressure, in order to enable a validation of the signals.

The shift element may be a multi-disk clutch in the drive train of a motor vehicle, preferably a wet multi-disk clutch. Multi-disk clutches are characterized by the good controllability of their capacity to transfer torque, and are therefore often employed in motor vehicle drive trains. In motor vehicle manufacturing, attention is always paid to low component weight and small dimensions. Therefore, the application of the method in such multi-disk clutches is particularly advantageous.

Preferably, the shift element serves as a separating clutch between an internal combustion engine and the rotor of an electric motor in the drive train of the motor vehicle. Particularly high demands for the control accuracy of the transfer of torque are frequently placed on such a separating clutch, since a jerky coupling of the internal combustion engine to the electric motor may be experienced by the driver of the motor vehicle as reducing comfort. Therefore, such a separating clutch is particularly suitable for torque-based controlling.

A control unit is operable or configured to implement the method. Such a control unit may be, for example, a component of a motor vehicle transmission, preferably an automatic transmission. Thereby, the motor vehicle transmission also includes the shift element.

BRIEF DESCRIPTION OF THE DRAWINGS

One exemplary embodiment of the invention is described in detail on the basis of the attached figures.

DETAILED DESCRIPTION

Figure 1:
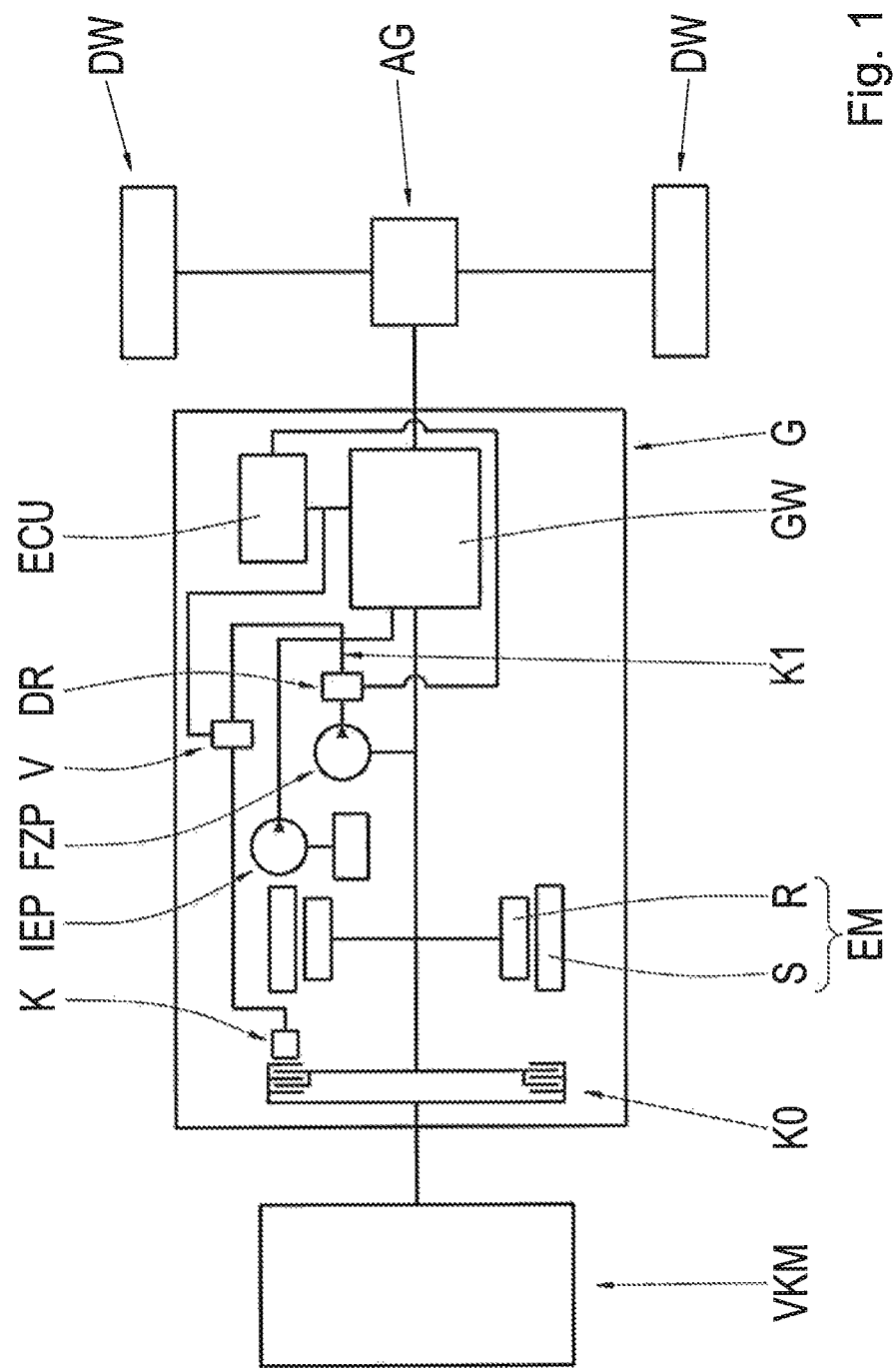
FIG. 1 schematically shows an exemplary drive train of a motor vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 schematically shows a drive train of a motor vehicle. An internal combustion engine VKM is connectable through a shift element K0 to an electric motor EM. The electric motor EM and the shift element K0 are parts of a motor vehicle transmission G. A piston K is allocated to the shift element K0. Through the application of pressure to the piston K, the shift element K0 can be closed, such that it is able to transmit torque. The motor vehicle transmission G features a gear change unit GW, which is configured to switch different transmission ratio relationships between an input shaft and an output shaft of the motor vehicle transmission G. The output shaft of the motor vehicle transmission G is connected in drive terms to an axle drive AG, through which the power of the output shaft is distributed to wheels DW of the motor vehicle. The gear change unit GW of the motor vehicle transmission G requires hydraulic pressure in order to provide its function. For this purpose, the motor vehicle transmission G includes a first oil pump IEP, which is electrically driven. Further, the motor vehicle transmission G includes a second oil pump FZP, which is driven by the input shaft of the motor vehicle transmission G, and to which a system pressure valve or pressure regulator DR is downstream. The two oil pumps IEP, FZP convey hydraulic fluid to a hydraulic circuit K1, whereas various control valves are assigned to the hydraulic circuit K1, including a control valve V for setting the closing pressure at the piston K for closing the shift element K0. The other valves of the hydraulic circuit K1 (not shown) serve the purpose of, for example, closing additional shift elements that are allocated to the gear change unit GW. The motor vehicle transmission G also includes a control unit ECU, which is configured to receive various signals and emit control commands. In any event, the control unit ECU may control the control valve V, in order to influence the pressure transmission from the hydraulic circuit K1 to the piston K of the shift element K0. The control unit ECU may also control the system pressure valve DR, in order to set a desired system pressure p_sys in the hydraulic circuit K1.

Figure 2:
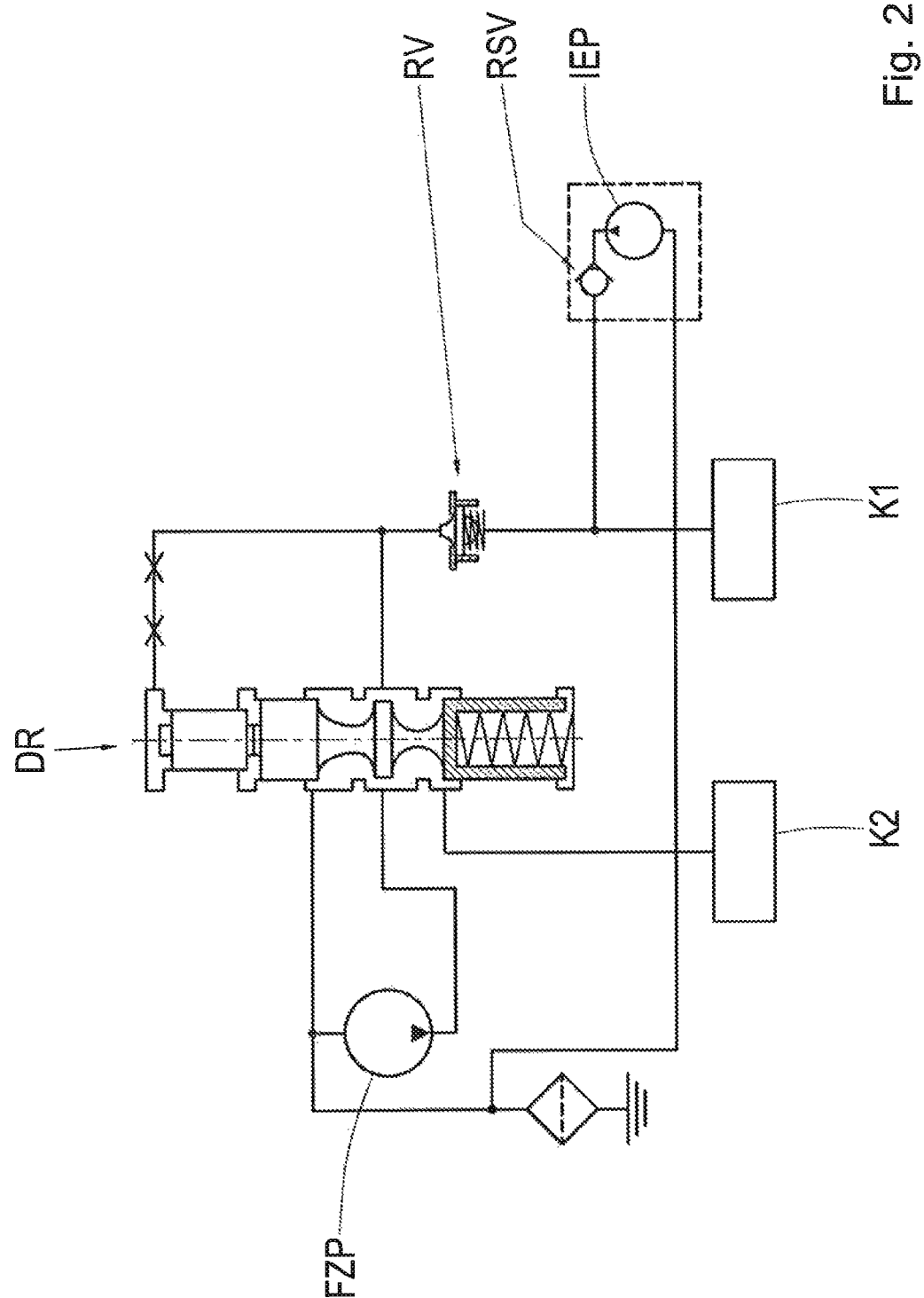
FIG. 2 schematically shows an exemplary drive train hydraulics of the motor vehicle.

FIG. 2 schematically shows a hydraulic system of the motor vehicle transmission G. The second oil pump FZP conveys hydraulic fluid from an oil sump to the pressure regulator DR. If the second oil pump FZP produces sufficient pressure, a substantially constant pressure is available at the output of the pressure regulator DR. In such a way, oil is conveyed by the second oil pump FZP and the pressure regulator DR through the retention valve RV into the hydraulic circuit K1. The first oil pump IEP conveys hydraulic fluid from the oil sump through a check valve RSV directly into the hydraulic circuit K1. The pressure regulator DR is further configured to direct oil to a secondary hydraulic circuit K2.

Figure 3:
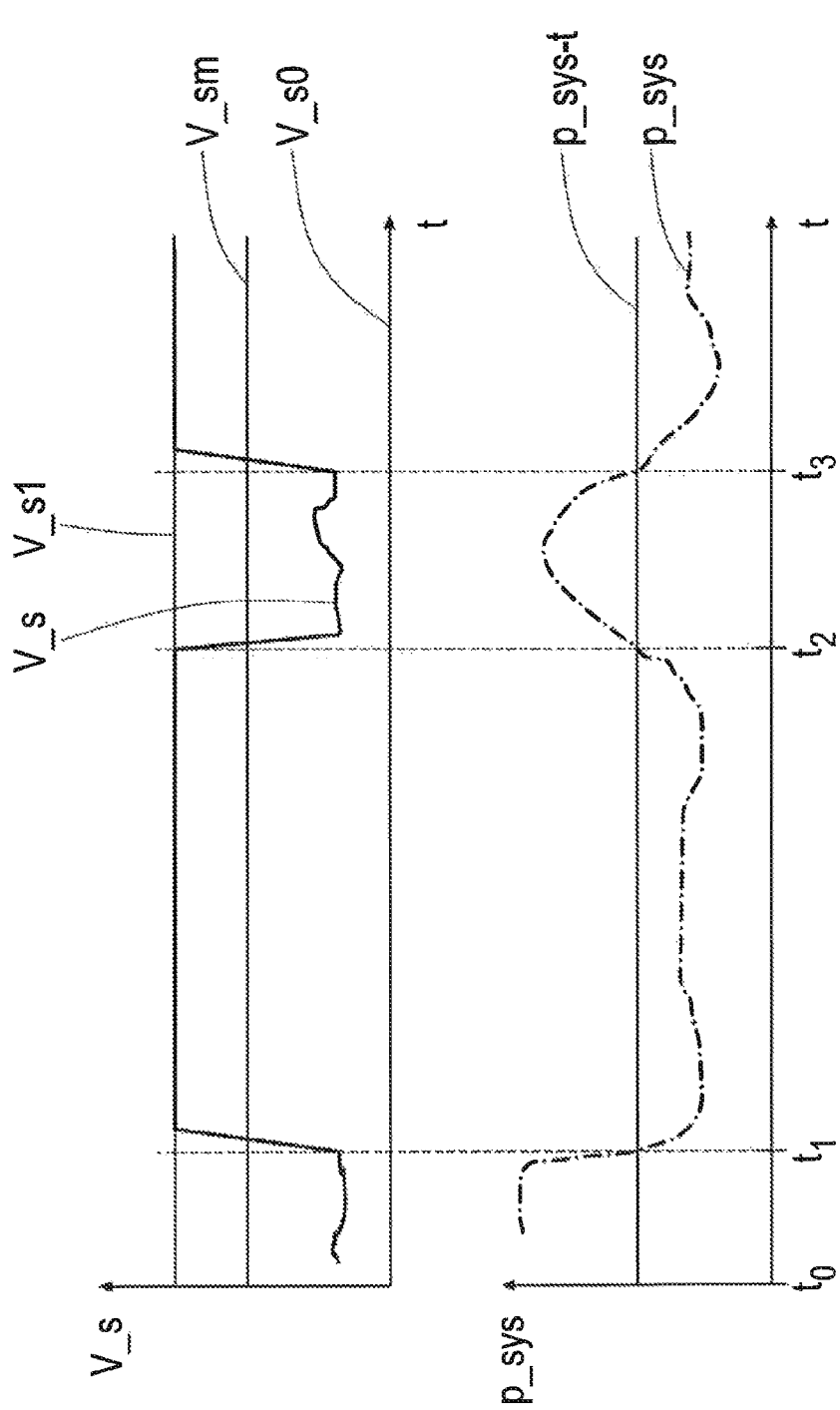
FIG. 3 schematically shows chronological curves of various values of the drive train hydraulics in accordance with a first exemplary arrangement of the invention.

FIG. 3 schematically shows chronological curves of the valve lift V_s of the control valve V and of the system pressure p_sys in the hydraulic circuit K1 in accordance with a first exemplary arrangement of the invention. The valve lift V_s may vary between the values V_s0 and V_s1. For a valve lift V_s with the value V_s0, the control valve V is fully closed, such that, except for leakage, no oil from the hydraulic circuit K1 can flow to the piston K. For a valve lift with the value V_s1, the control valve V is fully open. At the point in time t0, the system pressure p_sys is above a threshold value p_sys-t. Thereby, the valve lift V_s is controlled by the control unit ECU in such a manner that the resulting closing pressure at the piston K of the shift element K0 enables a target transmission torque of the shift element K0. After the point in time t0, the system pressure p_sys decreases until it reaches the threshold value p_sys-t at the point in time t1. Thereupon, the control valve V is fully open, by raising the valve lift V_s to the value V_s1. As long as the system pressure p_sys stays below the threshold value p_sys-t, the control valve V remains in its open position. At the point in time t2, the system pressure p_sys exceeds the threshold value p_sys-t. Thereupon, the valve lift V_s is reduced, and is once again controlled by the control unit ECU in such a manner that the resulting closing pressure at the piston K of the shift element K0 enables a target transmission torque of the shift element K0. At the point in time t3, the system pressure p_sys once again falls below the threshold value p_sys-t, such that the control valve V is once again fully open. Between the points in time t0 and t3, there is always a closing request at the shift element K0.

Figure 4:
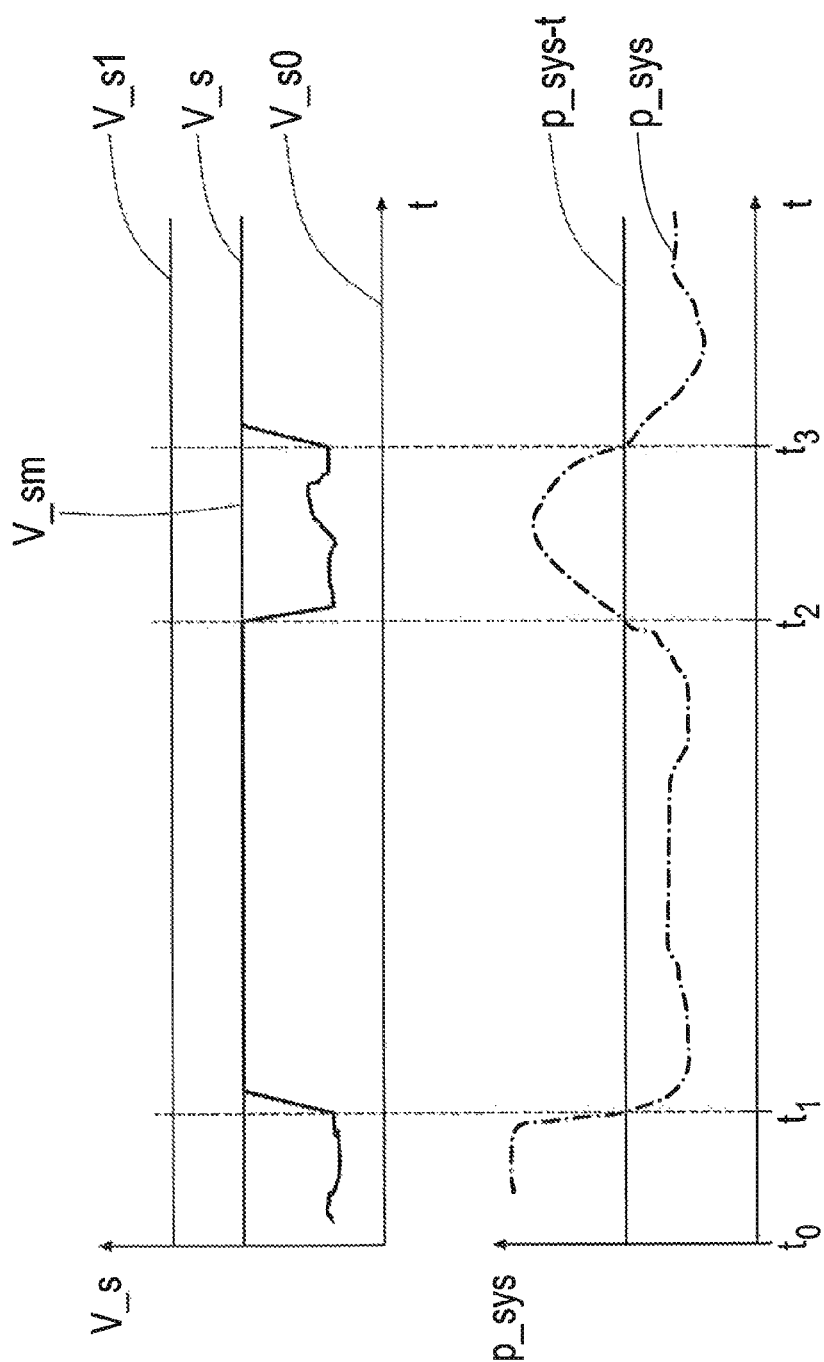
FIG. 4 schematically shows chronological curves of various values of the drive train hydraulics in accordance with a second exemplary arrangement of the invention.

FIG. 4 schematically shows chronological curves of the valve lift V_s of the control valve V and of the system pressure p_sys in the hydraulic circuit K1 in accordance with a second exemplary arrangement of the invention. At the point in time t0, the system pressure p_sys is above a threshold value p_sys-t. Thereby, the valve lift V_s is controlled by the control unit ECU in such a manner that the resulting closing pressure at the piston K of the shift element K0 enables a target transmission torque of the shift element K0. After the point in time t0, the system pressure p_sys decreases until it reaches the threshold value p_sys-t at the point in time t1. Thereupon, the valve lift V_s of the control valve V is set to an average value V_sm. Thereby, the average value V_sm is below the maximum valve lift V_s1, at which the control valve V is fully open. As long as the system pressure p_sys remains below the threshold value p_sys-t and a request to close is present at the shift element K0, the valve lift V_s remains in the center position V_sm. At the point in time t2, the system pressure p_sys exceeds the threshold value p_sys-t. Thereupon, the valve lift V_s is reduced, and is once again controlled by the control unit ECU in such a manner that the resulting closing pressure at the piston K of the shift element K0 enables a target transmission torque of the shift element K0. At the point in time t3, the system pressure p_sys once again falls below the threshold value p_sys-t, such that the control valve V is once again set at the center (intermediate) position V_sm. Between the points in time t0 and t3, there is always a closing request at the shift element K0.

In both arrangements, the lifting of the valve lift V_s upon exceeding the threshold value for the system pressure p_sys-t may also take place temporarily in predetermined time intervals. Between such predetermined time intervals, the control of the valve lift V_s may be carried out in the same manner as with a system pressure p_sys below the threshold value p_sys-t.

The system pressure p_sys may be determined by a pressure sensor (not shown), which measures the pressure prevailing in the hydraulic circuit K1, and is correspondingly connected to the control unit ECU. Alternatively or additionally, the system pressure p_sys may also be determined on the basis of the setpoint setting of the system pressure valve DR, in particular if the supply pressure of the hydraulic circuit K1 takes place solely through the second oil pump FZP. Moreover, a pressure model of the hydraulic circuit K1 may be used to determine the system pressure p_sys.

The formation of the drive train shown in FIG. 1 is to be viewed merely as exemplary. For example, the shift element K0 may also be formed outside of the motor vehicle transmission G as a separate module. Moreover, the control unit ECU may be located outside of the motor vehicle transmission G.

Modifications and variations can be made to the embodiments illustrated or described herein without departing from the scope and spirit of the invention as set forth in the appended claims.

REFERENCE SIGNS

G Motor vehicle transmission
IEP First oil pump
FZP Second oil pump
ECU Control unit
GW Gear change unit
VKM Internal combustion engine
EM Electric motor
S Stator
R Rotor K1 Hydraulic circuit
p_sys System pressure
p_sys-t Threshold value
K2 Secondary hydraulic circuit
V Control valve
K Piston
V_s Valve lift
V_s0 Minimum valve lift
V_s1 Maximum valve lift
V_sm Intermediate position
DR Pressure regulator
RV Retention valve
RSV Check valve
t0-t3 Points in time
AG Axle drive
DW Drive wheel

The invention claimed is:

1. A method for controlling torque transfer of a friction-type shift element, the friction-type shift element closable by a closing pressure acting on a piston, a control valve is configured to control the closing pressure depending on a control signal of a control unit, the control valve is also configured to transmit or reduce a system pressure of a hydraulic circuit to the piston through setting of a valve lift, the valve lift of the control valve variable between fully open and fully closed depending upon the control signal of the control unit such that the closing pressure acting on the piston provides a target transmission torque of the friction-type shift element, the method comprising:

controlling the closing pressure with the control valve upon presence of a closing request for the friction-type shift element and when a prevailing system pressure of the hydraulic circuit is above a threshold value for the system pressure, the closing pressure controlled with the control valve at least temporarily in a manner that is different than upon the presence of the closing request for the friction-type shift element and when the prevailing system pressure is below the threshold value for the system pressure.

2. The method of claim 1, wherein the closing pressure is controlled with the control valve depending on a torque to be transferred by the shift element when the prevailing system pressure is above the threshold value for the system pressure.

3. The method of claim 1, wherein the control valve is completely open when the prevailing system pressure is below the threshold value for the system pressure.

4. The method of claim 3, wherein the control valve is completely open only at predetermined time intervals when the prevailing system pressure is below the threshold value for the system pressure.

5. The method of claim 1, wherein the valve lift is set at an intermediate position at which a maximum permissible closing pressure is realizable when the prevailing system pressure is below the threshold value for the system pressure.

6. The method of claim 5, wherein the valve lift is set at the intermediate position only at predetermined time intervals when the prevailing system pressure is below the threshold value for the system pressure.

7. The method of claim 1, wherein the prevailing system pressure is determined with a signal from a pressure sensor.

8. The method of claim 1, further comprising controlling the prevailing system pressure with a system pressure valve using a set point of the system pressure valve as an input for the prevailing system pressure.

9. The method of claim 1, further comprising determining the prevailing system pressure with a pressure model.

10. The method of claim 1, wherein the friction-type shift element is a wet multi-disk clutch in a vehicle drive train.

11. The method of claim 10, wherein the wet multi-disk clutch is a separating clutch between an internal combustion engine and an electric motor rotor.

12. The control unit for operating a drive train configured to implement the method of claim 1.

13. The control unit of claim 12, wherein the control unit and the friction-type shift element are components of a motor vehicle transmission.

* * * * *